US007000977B2

(12) United States Patent
Anders

(10) Patent No.: US 7,000,977 B2
(45) Date of Patent: Feb. 21, 2006

(54) SLIDABLE AND HINGED DOOR, ESPECIALLY OF A MOTOR VEHICLE

(75) Inventor: Michael Anders, Magstadt (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 10/938,938

(22) Filed: Sep. 9, 2004

(65) Prior Publication Data

US 2005/0082871 A1 Apr. 21, 2005

(30) Foreign Application Priority Data

Sep. 9, 2003 (DE) ................................ 103 41 420

(51) Int. Cl.
*B60J 5/00* (2006.01)

(52) U.S. Cl. .............. 296/155; 296/146.12; 296/146.4; 49/248

(58) Field of Classification Search ................ 296/155, 296/146.12, 146.4; 49/246, 248
See application file for complete search history.

(56) References Cited

U.S. PATENT DOCUMENTS

| | | | | |
|---|---|---|---|---|
| 2,993,730 A * | 7/1961 | Weiertz | ................. | 296/146.13 |
| 4,135,760 A * | 1/1979 | Grossbach | .................. | 296/155 |
| 6,877,791 B1 * | 4/2005 | Greuel et al. | ............ | 296/146.4 |
| 2003/0107237 A1 | 6/2003 | Brodt et al. | | |

FOREIGN PATENT DOCUMENTS

| | | |
|---|---|---|
| DE | 21 05 658 | 8/1972 |
| DE | 38 14 564 | 11/1988 |
| DE | 101 55 220 | 2/2003 |

* cited by examiner

*Primary Examiner*—Stephen Gordon
(74) *Attorney, Agent, or Firm*—Kenyon & Kenyon

(57) ABSTRACT

A slidable and hinged door, e.g., in a motor vehicle, in which the door is displaceable from the plane of a door opening by at least one swivel arm developed as a double hinge, and, for the sliding function, is displaceable into a plane arranged in front of it that is approximately parallel to it and is slidable in the plane arranged in front of it by a parallel guidance, may be simple to handle and to be operated by motor, at the same time as having a simple arrangement from a construction point of view. The swiveling motions and/or the swiveling possibilities for the operation of the door are able to be activated or determined within the double hinge by servomotors engaging at the first and the second hinge of the double hinge.

7 Claims, 2 Drawing Sheets

SLIDABLE AND HINGED DOOR, ESPECIALLY OF A MOTOR VEHICLE

CROSS-REFERENCE TO RELATED APPLICATIONS

The present application claims priority to Application No. 103 41 420.7, filed in the Federal Republic of Germany on Sep. 9, 2003, which is expressly incorporated herein in its entirety by reference thereto.

FIELD OF THE INVENTION

The present invention relates to a slidable and hinged door, e.g., of a motor vehicle.

BACKGROUND INFORMATION

Certain doors, which may optionally be operated as sliding or hinged doors, are described in German Published Patent Application No. 21 05 658.

In addition, German Published Patent Application No. 38 14 564 also describes an optionally hinged or slidable motor vehicle door.

SUMMARY

According to an example embodiment of the present invention, the construction and function of a door may be improved. For example, a door may be operated in a simple manner by a motor. At least the functional selection to be undertaken by the user of a door may be undertaken as simply as possible.

An example embodiment of the present invention may set by motor the different functions of the two door hinges that have been combined to one double hinge. In this context, the hinged and or sliding movement for operating the door may be made by hand or, e.g., also by motor. No hand operation may be necessary for the functionally conditioned intermittent locking of the two hinges of the double hinge. These lockings may be by motor.

Because of the possibility of being able optionally to swivel open or slide open a motor vehicle door, the vehicle user may decide from case to case which of the two possibilities may be used in each case under the respective given circumstances. The sliding function may be used in a place that is too small for opening the door by the hinged movement. Another aspect of such a double operating function of a motor vehicle door is that, if an accident has interfered with the functioning of the sliding mechanism, the possibility still exists of opening the door by swiveling it open. In this regard, sliding mechanisms may be considerably more susceptible to interfering or damage than swivel mechanisms.

With the aid of servomotors, it may be possible compulsorily to set a vehicle door in the closed state to the swivel function, or rather, to let it assume a swivel function.

The servomotors may be programmed such that a vehicle door, in a moving vehicle, is compulsorily set to the swivel function.

Using the device according to an example embodiment of the present invention, the automatic opening of a vehicle door, both in the swivel function and in the sliding function, may be possible without any problem. In the case in which, besides the movements of the door on the hinges of the double hinge, the sliding of the door with respect to the double hinge is also supposed to take place automatically, an additional servomotor may be provided between door and double hinge.

On account of the servomotors according to an example embodiment of the present invention, it may be possible to preprogram the most varied door opening positions, e.g., in both the swivel and the sliding function. In response to such preprogrammed opening functions, the vehicle's user may choose between the individual preprogrammed opening procedures and settings via a corresponding switching device that is to be operated by him.

According to an example embodiment of the present invention, a device includes: a slidable and hinged door; at least one swivel arm configured as a double hinge arranged to displace the door from a plane of a door opening, the double hinge configured to provide a slide motion of the door to displace the door into a plane arranged in front of the plane of the door opening and approximately parallel to the plane of the door opening and to slide the door in the plane arranged approximately parallel to the plane of the door opening by parallel guidance, the double hinge connected to a door frame configured to limit opening of the door, the double hinge including a first hinge and a second hinge, each of the first hinge and the second hinge including an axis parallel to each other, the first hinge and the second hinge hingedly supported with respect to each other, the first hinge rotatably fixed to the door frame, the second hinge rotatably fixed to the door; and servomotors arranged to engage the first hinge and the second hinge. The door is configured to swivel on the axis of the first hinge in response to a selected swivel function of the door, and the door is configured to swivel on the axis of the first hinge and on the axis of the second hinge in response to a selected sliding function of the door. The servomotors are configured to one of (a) activate and (b) determine at least one of (a) swivel motions and (b) swivel possibilities of the double hinge.

The door may be arranged as a door of a motor vehicle.

In a closed state of the door, the door may be compulsorily configured to swivel.

The door may be compulsorily configured to swivel when the motor vehicle is moving.

The device may include a servomotor, which may be arranged in a connection between the door and the double hinge and which may be configured to slide the door with respect to the double hinge.

In a closed state of the door, the door may be compulsorily configured to swivel on the axis of the first hinge.

The door compulsorily may be configured to swivel on the axis of the first hinge when the motor vehicle is moving.

An exemplary embodiment is explained in more detail below with reference to the appended Figures.

DETAILED DESCRIPTION

Figure 1:
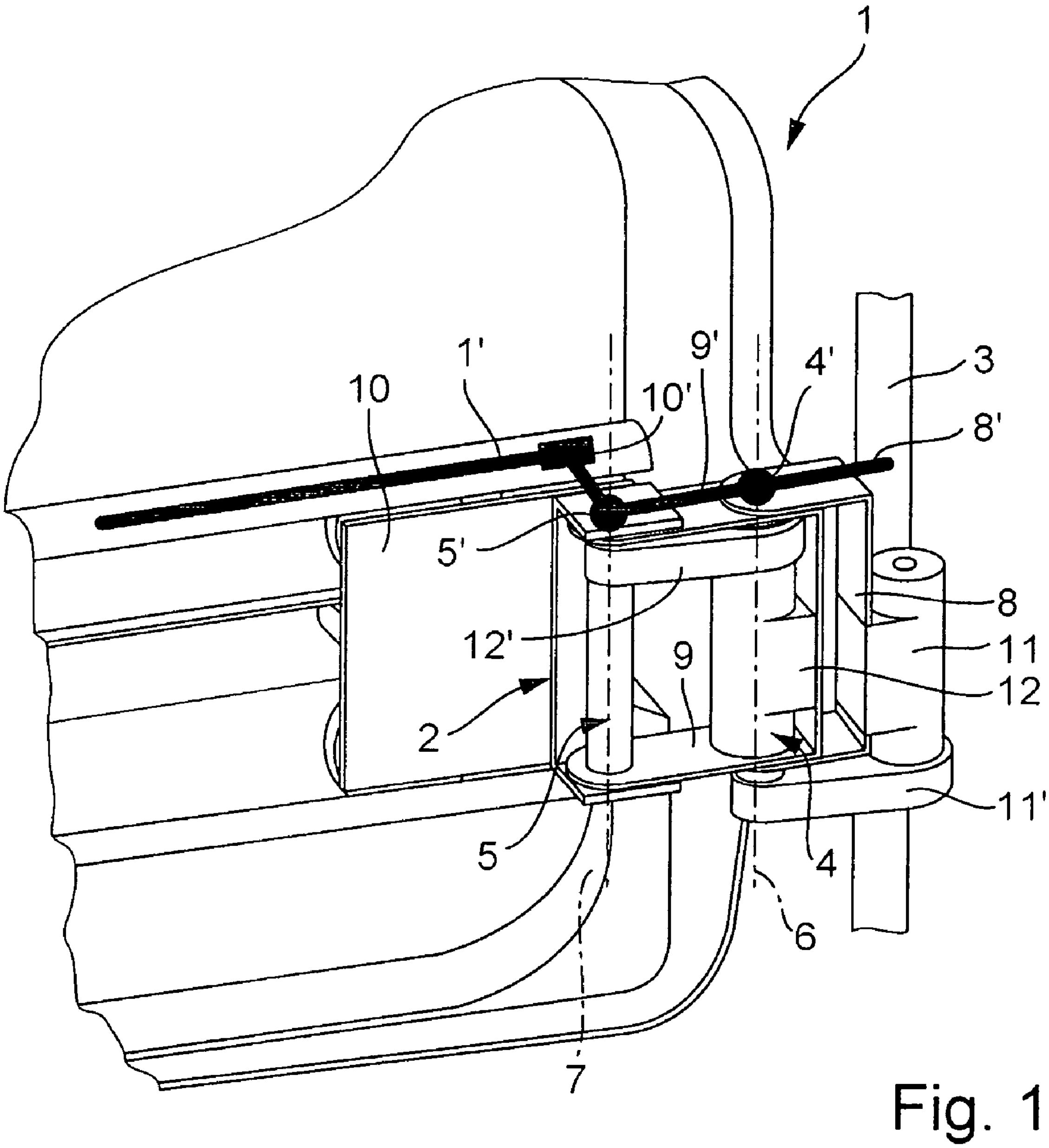
FIG. 1 illustrates the suspension of a vehicle door on the A column of a vehicle, as seen on the left side from within.

A vehicle door 1 is suspended from an A column 3 of a motor vehicle via a double hinge 2. Double hinge 2 includes a first hinge 4 and a second hinge 5 having axes 6 at first hinge 4 and 7 at second hinge 5 extending parallel to each other. In axis 6 of first hinge 4, a bracket 8 fixedly connected to the A column and a U-shaped bridge crosspiece 9 are hinged. This bridge crosspiece 9 is supported about axis 6 of first hinge 4 in a swiveling manner and supported in axis 7 of second hinge 5. Also supported within second hinge 5 in a manner able to be swivelled with respect to bridge crosspiece 9 is a flange 10 leading to door 1. On this flange 10 door 1 is supported in a slidable manner. In FIG. 1, the hinging of the door is illustrated schematically in bold line direction. The components illustrated schematically are shown with the same reference numerals if they functionally coincide with the components drawn in detail; however, they are given a prime superscript to differentiate them.

Servomotors 11 and 12 are respectively allocated to first hinge 4 and second hinge 5. Using servomotor 11 that is fastened to bracket 8, bridge crosspiece 9 may be rotated in axis 6 with respect to bracket 8 or stopped or let loose to swivel freely.

Servomotor 12 is fixedly connected to bridge crosspiece 9 and is used to effect a swiveling motion between flange 10 and bridge crosspiece 9, to prevent it, or to leave them free.

The force transmission of servomotors 11 and 12 to the respective components driven by them takes place via a drive belt 11' and 12', respectively.

Figure 2:
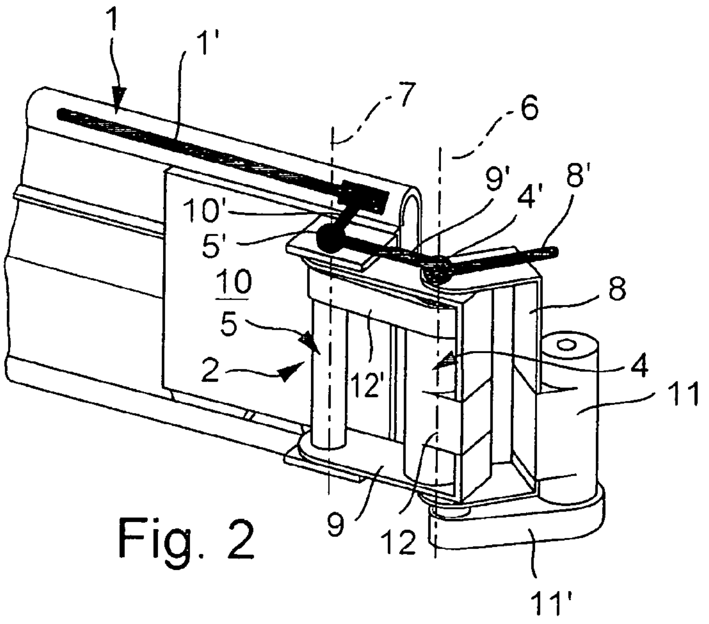
FIG. 2 illustrates the vehicle door as illustrated in FIG. 1 in a slightly opened position.
Figure 3:
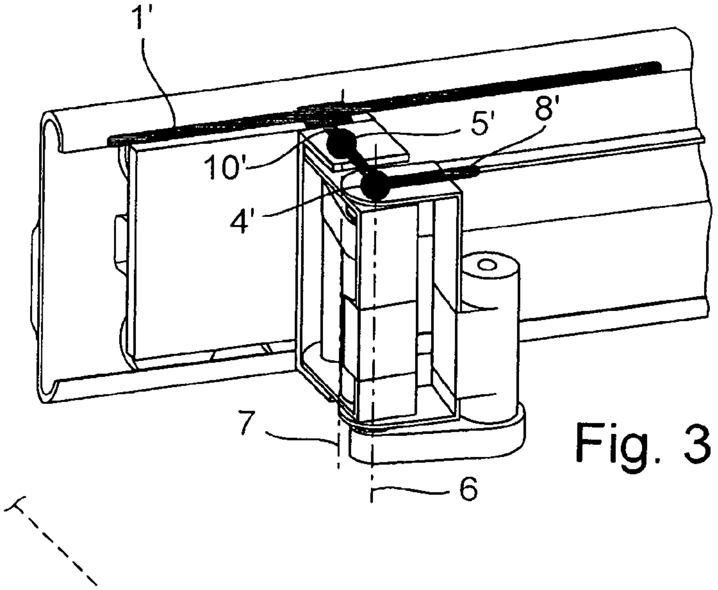
FIG. 3 illustrates the same door in an open sliding position.

FIGS. 2 and 3 illustrate various states of movement of the door illustrated in FIG. 1. In the state of motion illustrated in FIG. 2, the door is swivelled in first hinge 4 while second hinge 5 is stopped.

In the state of movement illustrated in FIG. 3, the sliding position of door 1 is reached. In order to reach this position, a rotation takes place in both hinges 4 and 5. In order to be able to move door 1 in the sliding position illustrated in FIG. 3, hinges 4 and 5 may be stopped by servomotors 11 and 12. Servomotors 11, 12 may be arranged as electrical stepper motors.

Figure 4:
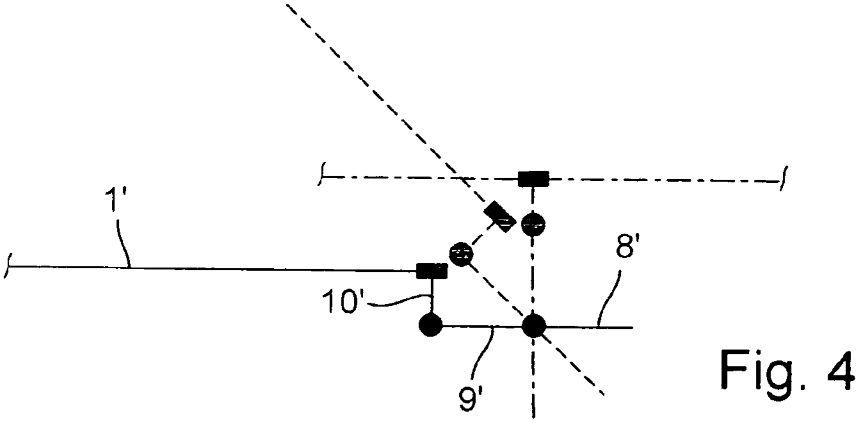
FIG. 4 is a schematic view of a door that is partially open in a swivel position and completely open in a sliding position in a top view, the door being indicated in the swivel position as a dashed line and in the sliding position as a dashed and dotted line.

In FIG. 4 various positions are illustrated of the door hinged in a manner illustrated in FIGS. 1 to 3. Parts having the same or similar functions are marked in FIG. 4 with the same reference numerals as in FIGS. 1 to 3. The door is illustrated in the closed position by solid lines, in the sliding position by dashed and dotted lines and in the half open swivel position by dashed lines.

By the use of, e.g., electrical servomotors, the rotary motions being executed in the two hinges 4 and 5 of the double hinge, including the stopping of these hinges may be adjusted to one another as desired. For this, an appropriate programming of the drives of these servomotors may be needed.

What is claimed is:

1. A device, comprising:

a slidable and hinged door;

at least one swivel arm configured as a double hinge arranged to displace the door from a plane of a door opening, the double hinge configured to provide a slide motion of the door to displace the door into a plane arranged in front of the plane of the door opening and approximately parallel to the plane of the door opening and to slide the door in the plane arranged approximately parallel to the plane of the door opening by parallel guidance, the double hinge connected to a door frame configured to limit opening of the door, the double hinge including a first hinge and a second hinge, each of the first hinge and the second hinge including an axis parallel to each other, the first hinge and the second hinge hingedly supported with respect to each other, the first hinge rotatably fixed to the door frame, the second hinge rotatably fixed to the door; and servomotors arranged to engage the first hinge and the second hinge;

wherein the door is configured to swivel on an axis of the first hinge in response to a selected swivel function of the door, the door configured to swivel on the axis of the first hinge and on an axis of the second hinge in response to a selected sliding function of the door, the servomotors configured to one of (a) activate and (b) determine at least one of (a) swivel motions and (b) swivel possibilities of the double hinge.

2. The device according to claim 1, wherein the door is arranged as a door of a motor vehicle.

3. The device according to claim 1, wherein, in a closed state of the door, the door is compulsorily configured to swivel.

4. The device according to claim 3, wherein the door is configured as a door of a motor vehicle, the door compulsorily configured to swivel when the motor vehicle is moving.

5. The device according to claim 1, further comprising a servomotor arranged in a connection between the door and the double hinge and configured to slide the door with respect to the double hinge.

6. The device according to claim 1, wherein, in a closed state of the door, the door is compulsorily configured to swivel on the axis of the first hinge.

7. The device according to claim 6, wherein the door is configured as a door of a motor vehicle, the door compulsorily configured to swivel on the axis of the first hinge when the motor vehicle is moving.

* * * * *